Patented July 30, 1940

2,209,749

UNITED STATES PATENT OFFICE 2,209,749

WATER-INSOLUBLE AZO DYESTUFFS

Gerhard Schrader, Elberfeld I. G.-Werk, and Otto Bayer, Leverkusen I. G. Werk, Germany, assignors to General Aniline & Film Corporation, a corporation of Delaware No Drawing. Application May 11, 1938, Serial No. 207,304. In Germany May 22, 1937

6 Claims. (Cl. 260—204)

The present invention relates to new water-insoluble azo dyestuffs, to a method of preparing the same and to fibers dyed with the said dyestuffs; more particularly it relates to azo dyestuffs of the general formula

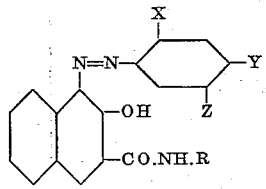

In this formula R stands for an aromatic radical free from water-solubilizing groups, X stands for a sulfonamide group, the hydrogen atoms of which may be substituted, Y and Z may stand for the same or different radicals and mean alkyl or halogen.

Our new dyestuffs may be produced either in substance or on the fiber and are obtained by coupling diazo compounds of aromatic bases of the general formula

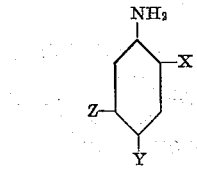

wherein X, Y and Z mean the same as stated above, with arylamides of β-hydroxynaphthoic acid. The diazo compounds may also be employed in the form of diazoamino compounds whereby the diazo compound capable of coupling is regenerated on the fiber in the course of the reaction.

The aromatic bases used in the described process as diazo components can be obtained as follows: the sulfonic acids of the formula

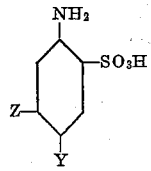

(Z and Y meaning the same as above) are converted into the acid chloride by treatment with chlorosulfonic acid and the acid chlorides thus obtained are caused in the usual way to react with ammonia or aliphatic bases to form the sulfonamides. Also the sulfonic acids of the mentioned type, which contain instead of the amino-group the nitro-group, may be used; in this case, after the formation of the sulfonamide, the nitro group is reduced in the usual way to the amino-group.

The new azo dyestuffs yield red to orange shades and are distinguished by a remarkably good fastness to light and weather.

Example

Well scoured and dried cotton yarn is impregnated with a solution containing 3.2 g. of 2-naphthol-3-carboxylic acid β-naphthyl-amide, 6 ccs. of sodium hydroxide solution (36° Bé.), and 6 ccs. of Turkey red oil per litre, wrung out and, without drying, developed in a diazo solution which contains 2.6 g. of 1.2-dimethyl-4-sulfo-dimethyl-amide-5-aminobenzene (melting-point 122° C.) per litre, and is neutralized with sodium acetate, rinsed and scoped. Thus a yellowish scarlet is obtained of very food fastness to light and weather.

In a similar way dyestuffs or dyed fibers are obtained with the following bases and coupling components:

| Base | Coupling component | Shade |
|---|---|---|
| CH₃—⌬—NH₂, CH₃—⌬—SO₂N(CH₃)₂ (Melting-point 151° C.) | ⌬—OH, ⌬—CO.NH—⌬—OCH₃ with Cl | Yellowish red. |
| CH₃—⌬—NH₂, CH₃—⌬—SO₂N(C₂H₅)₂ (Melting point 122° C.) | ⌬—OH, ⌬—CO.NH—⌬—Cl with OCH₃, OCH₃ | Do. |
| Do. | ⌬—OH, ⌬—CO.NH—⌬ with OCH₃, OCH₃ | Do. |

| Base | Coupling component | Shade |
|---|---|---|
| Cl—⬡—NH₂, Cl—⬡—SO₂.N(CH₃)₂ (Melting point 141° C.) | naphthol-OH, CO.NH—⬡—CH₃ | Reddish orange. |
| Do | naphthol-OH, CO.NH—naphthyl | Yellowish red. |
| CH₃—⬡—NH₂, Cl—⬡—SO₂N(C₂H₅)₂ (Melting point 107° C.) | naphthol-OH, CO.NH—⬡(OCH₃)(Cl)(OCH₃) | Orange. |
| Do | naphthol-OH, CO.NH—⬡(OCH₃)(OCH₃)(Cl) | Yellowish red. |
| Cl—⬡—NH₂, CH₃—⬡—SO₂.N(CH₃)₂ (Melting point 134–135° C.) | naphthol-OH, CO.NH—naphthyl | Yellowish scarlet. |

All these dyeings are distinguished by good fastness to light and weather.

We claim:

1. Water-insoluble azo dyestuffs of the general formula

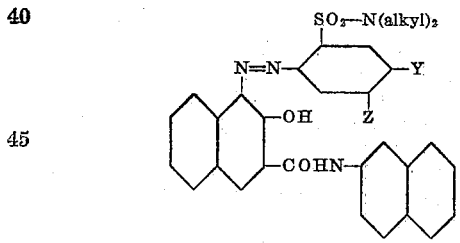

wherein Y and Z stand for radicals of the group consisting of alkyl and halogen, yielding, when produced on the fiber, red to orange shades of remarkably good fastness to light and weather.

2. The water-insoluble azo dyestuff of the formula

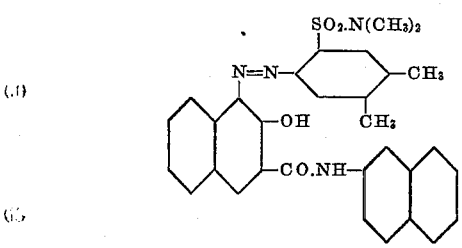

yielding, when produced on the fiber, yellowish scarlet shades of very good fastness to light and weather.

3. The water-insoluble azo dyestuff of the formula

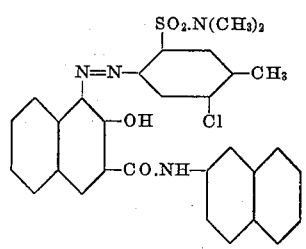

yielding, when produced on the fiber, yellowish scarlet shades of very good fastness to light and weather.

4. Fibers dyed with a dyestuff as claimed in claim 1.

5. Fibers dyed with a dyestuff as claimed in claim 2.

6. Fibers dyed with a dyestuff as claimed in claim 3.

GERHARD SCHRADER.
OTTO BAYER.